(12) United States Patent
Shumka et al.

(10) Patent No.: US 11,921,084 B2
(45) Date of Patent: Mar. 5, 2024

(54) INTEGRATED SYSTEM FOR ASSESSING AND MODELING INTEGRITY OF WHEELS AND RIMS OF OFF THE ROAD VEHICLES

(71) Applicant: OTR WHEEL SAFETY, INC., Kelowna (CA)

(72) Inventors: Thomas Shumka, Kelowna (CA); Jason Shumka, Kelowna (CA)

(73) Assignee: CleanSolv International LTD, Kelowna (CA)

( * ) Notice: Subject to any disclaimer, the term of this patent is extended or adjusted under 35 U.S.C. 154(b) by 0 days.

(21) Appl. No.: 17/609,302

(22) PCT Filed: Jan. 23, 2020

(86) PCT No.: PCT/CA2020/000008
§ 371 (c)(1),
(2) Date: Nov. 5, 2021

(87) PCT Pub. No.: WO2020/223788
PCT Pub. Date: Nov. 12, 2020

(65) Prior Publication Data
US 2022/0221428 A1 Jul. 14, 2022

(30) Foreign Application Priority Data
May 6, 2019 (CA) ..................................... 3042657

(51) Int. Cl.
*G01M 17/013* (2006.01)
*G01N 21/88* (2006.01)
*G01N 23/223* (2006.01)
*G01N 27/90* (2021.01)
*G01N 27/9013* (2021.01)
*G01N 27/904* (2021.01)
*G05B 23/02* (2006.01)
(Continued)

(52) U.S. Cl.
CPC ........ *G01N 27/902* (2013.01); *G01M 17/013* (2013.01); *G01N 21/8851* (2013.01);
(Continued)

(58) Field of Classification Search
CPC ............. G01N 27/902; G01N 21/8851; G01N 23/223; G01N 27/9006; G01N 27/904;
(Continued)

(56) References Cited

U.S. PATENT DOCUMENTS

2008/0192897 A1* 8/2008 Piorek .................. G01N 23/223
378/102
2016/0153806 A1* 6/2016 Ciasulli .............. G06Q 10/0633
702/183

(Continued)

OTHER PUBLICATIONS

Fang, Xiu-Yang, Yong-Xiang Zhao, and Huan-Wei Liu. "Study on fatigue failure mechanism at various temperatures of a high-speed railway wheel steel." Materials Science and Engineering: A 696 (2017). pp. 299-314. (Year: 2017).*

(Continued)

*Primary Examiner* — John E Johansen
(74) *Attorney, Agent, or Firm* — Baumgartner Patent Law; Marc Baumgartner

(57) ABSTRACT

A method and system for inspecting a steel wheel or steel rim of an off the road vehicle is provided. A method and system for predictive modeling of health and remaining useful life of a steel wheel or steel rim of the off the road vehicle is also provided. The off the road vehicles include vehicles at remote locations such as mine sites.

3 Claims, 15 Drawing Sheets

(51) Int. Cl.
*B60S 5/00* (2006.01)
*G01N 23/2206* (2018.01)

(52) U.S. Cl.
CPC ....... *G01N 23/223* (2013.01); *G01N 27/9006* (2013.01); *G01N 27/904* (2013.01); *G05B 23/0283* (2013.01); *B60S 5/00* (2013.01); *G01N 2021/8887* (2013.01); *G01N 23/2206* (2013.01)

(58) Field of Classification Search
CPC ...... G01N 23/2206; G01N 2021/8887; G01M 17/013; G05B 23/0283; B60S 5/00
USPC .......................................................... 703/8
See application file for complete search history.

(56) References Cited

U.S. PATENT DOCUMENTS

2017/0176294 A1* 6/2017 Shumka ............. G01M 17/013
2018/0095450 A1* 4/2018 Lappas .................. G06T 19/00
2018/0173216 A1 6/2018 Spiro et al.

OTHER PUBLICATIONS

Hawk, J. A., et al. "Laboratory abrasive wear tests: investigation of test methods and alloy correlation." Wear 225 (1999). pp. 1031-1042. (Year: 1999).*
Machave, Gaurav, and Pote Susheel Sambhaji. "Study of influence of pressure and load on wheel rim by radial fatigue test." International Journal of Innovation Research in Science Engineering and Technology 4.2. (2015). pp. 298-303. (Year: 2015).*
International Search Report issued in PCT/CA2020/000008 dated May 20, 2020 (8 pages).
Written Opinion issued in PCT/CA2020/000008 dated May 20, 2020 (7 pages).
International Preliminary Report on Patentability issued in PCT/CA2020/000008 dated Aug. 9, 2021 (18 pages).

* cited by examiner

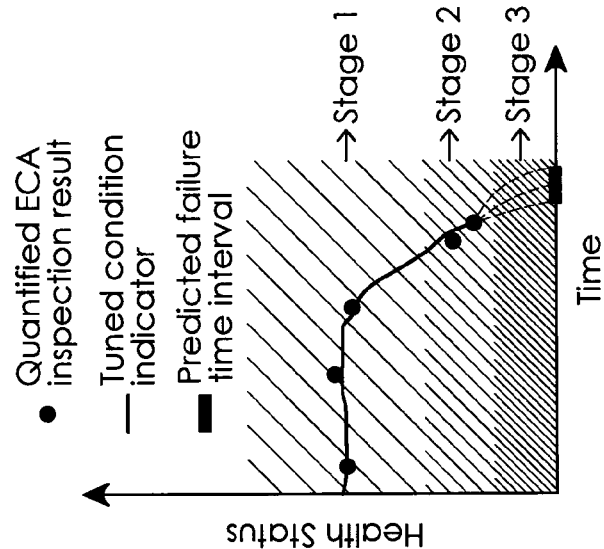
FIG. 15c
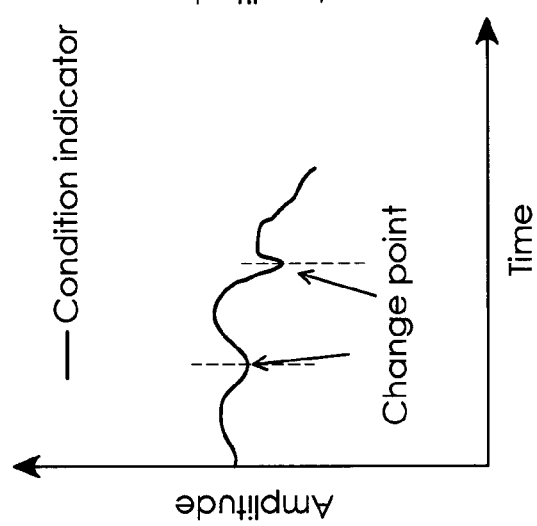
FIG. 15b
FIG. 15a

INTEGRATED SYSTEM FOR ASSESSING AND MODELING INTEGRITY OF WHEELS AND RIMS OF OFF THE ROAD VEHICLES

CROSS-REFERENCE TO RELATED APPLICATIONS

The present invention is filed under 35 U.S.C. § 371 as the U.S. national phase of International Application No. PCT/CA2020/000008, filed Jan. 23, 2020, which designated the U.S. and claims the right of priority of Canadian Patent Application No. 3,042,657, filed May 6, 2019. The entire disclosures of the above-identified priority applications are hereby fully incorporated herein by reference.

FIELD

The present technology is an integrated system that allows for concomitant testing of multiple wheels and rims of off the road (OTR) vehicles in multiple locations, followed by data analysis, storage and predictive modeling in a central facility. More specifically, it is a computing system, an eddy current array probe, an X-ray fluorescence analyzer and a light microscope for use during non-destructive inspection of wheels and rims of OTR vehicles for defects and wear.

BACKGROUND

Current practices for inspecting off the road vehicle wheels and rims, particularly in the mining sector, involves shipping wheels and rims to a central facility for inspection, repair and certification. This facility may be hundreds of miles from the mine site. When at the facility, electromagnetic, in particular, Magnetic Particle Inspection is conducted. Approximately 50% of the wheels and rims shipped from a mine site to a central facility are in good condition. The logistics of this are cumbersome but it is the only option available to mining customers. Further to this, the assessment is a visual assessment, therefore it is dependent on the skill and experience of the assessor. Still further, the data are not electronically acquired and stored and must, therefore, be manually entered should an archive be desired.

The most critical region for examination on an OTR wheel and rim is where metal meets metal. The section that has direct metal to metal contact is the lock ring groove section. The gutter section of an OTR rim or wheel has 4 distinct individual groove patterns (HDT, EM, EMH, & EV). The groove design is usually selected based on rim size and application. The back section has 3 distinct manufacture designs (MES standard, TSR, IGLR and DGS). Selection of the back section design is related to tire support and positioning on the truck. Significantly, there are seven main rim profiles used in OTR mining truck vehicles. There are also various wheel and rim profiles for graders, loaders, logging trucks, port facilities and other off the road vehicles.

Eddy current array testing has been shown to be extremely useful in testing wheels and rims of off the road vehicles, such as wheels and rims of trucks used in mining. For example, Canadian Patent No. 2943475 discloses a method of examining a wheel or rim on site is provided using a system comprising an eddy current array probe in electronic communication with a computer, the computer having a processor and a memory, the memory to provide instructions to the processor. The method comprises: standardizing the eddy current array probe with a reference standard; adjusting the eddy current array probe with a lift off screw to provide a suitable distance between the probe and a surface of the wheel or rim; scanning the wheel or rim with an alternating current; sending a data set to the computer; the computer analyzing the data set; and the computer displaying a three-dimensional image of the data set on a user interface. This method is particularly developed for off the road vehicles at mining sites or any off the road vehicle wheels and rims. Human error and a lack of adequately trained personnel have limited the utility of this testing method. Further, it only provides information on the current state of the wheel or rim and does not provide insight into the health and remaining useful life.

Elemental analysis has been used with other parameters to predict toughness of metal, for example, United States Patent Application 20180217104 discloses systems and methods for determining a toughness value for a material of a metal part, wherein the method comprises detecting a texture of a carbon steel material using an ultrasonic microscopy unit, wherein the ultrasonic microscopy unit uses one or more waveforms including at least one of straight beam, phased array, shear wave, and time-of-flight diffraction (TOFD); determining elemental analysis of the carbon steel material; combining the texture with the elemental analysis to generate a toughness value for the steel; comparing the generated toughness value with a standard curve, wherein when the toughness value falls below the curve, the carbon steel material comprises an acceptable toughness, and when the toughness value falls above the curve, the carbon steel material comprises an unacceptable toughness. Currently there is no knowledge base that relates the quality of the steel used in off the road wheels and rims and the useful life of those wheels and rims.

Light microscopy has been used to assess corrosion cracking, corrosion fatigue, and hydrogen embrittlement in metals. Grain size and shape (indicative of both chemistry and processing), inclusions, and internal stress patterns are also some of the common items of interest for light microscopy imaging of metals. Despite this, currently there is no knowledge base that relates microscopic structure of steel in off road wheels and rims and the useful life of those wheels and rims.

What is needed is a system that allows for concomitant inspecting of multiple steel wheels and steel rims of OTR vehicles in multiple locations, followed by data analysis at a customer location or in a central facility. It would be preferable if the inspecting included assessments of steel quality in terms of elemental analysis and microscopic structure in addition to eddy current array testing for damage and wear. It would be preferable if the system could identify faulty eddy current array inspections, including dwelling in a given position or not testing 360 degrees of the wheel. What is also needed is a system that integrates data from non-destructive testing with predictive maintenance and machine learning algorithms to provide predictive models of wheel and rim health and potential failure modes of the wheels and rims.

SUMMARY

The present technology is directed to a system that allows for concomitant testing of multiple wheels and rims of OTR vehicles in multiple locations, with data analysis in a central facility. The system is designed to reduce unnecessary wheel and rim changes as it can identify faulty tests, including dwelling in a given position or not testing 360 degrees of the wheel. Errors in testing can be communicated back to the remote testing site by the computing system. The computing system is also able to communicate with an Enterprise resource planning (ERP) system. This may be by WiFi or Bluetooth® radio or other wireless communication. The data collection includes positive material identification and microscopic characterization, which together are indicative of the quality of the steel, and both eddy current array testing and microscopic characterization which together are indicative of the health of the steel. The system also integrates data from non-destructive testing with predictive maintenance and machine learning algorithms to provide predictive models of wheel and rim health and potential failure modes of the wheels and rims. Predictive models are provided for subsequent scheduling of inspecting and preventative maintenance.

In one embodiment, a system for predictive modeling of wear and damage to a steel wheel or steel rim of an off the road vehicle on site is provided, the system comprising: an eddy current array probe, which is configured to generate and transmit scans; and a computing device which is electronic communication with the eddy current array probe and includes a memory and a processor, the processor under control of the memory, wherein the memory is configured to receive the scans, determine changes in the scans over time, statistically analyze the changes in relation to time to provide a set of time-based features, apply the time-based features as input values to a selected transformation, and develop a predictive model of health and remaining useful life of the steel wheel or rim using the selected transformation.

The system may further include an X-ray fluorescence analyzer.

In the system, the memory may be configured to correlate data from the X-ray fluorescence analyzer (Positive Material Identification) with the time-based features.

In the system, the memory may be configured to develop an elemental analysis-based predictive model of health and lifespan based on data from the X-ray fluorescence analyzer.

The system may further include a high-resolution microscope.

In the system, the memory may be configured to correlate data from the high-resolution microscope with the time-based features.

In the system, the memory may be configured to develop a microstructure-based predictive model of health and lifespan based on data from the high-resolution microscope.

In the system, the memory may be configured to combine the elemental analysis-based predictive model with the microstructure-based predictive model to determine a predictive model of health and lifespan.

In another embodiment, a method of inspecting a steel wheel or steel rim of an off the road vehicle on site is provided, the method comprising: selecting a system comprising an X-ray fluorescence analyzer in electronic communication with a remote location computer, an eddy current array probe in electronic communication with the remote location computer, the remote location computer having a processor, a memory, the memory to provide instructions to the processor and a user interface, and a central facility computer, which includes a processor and a memory, the memory to provide instructions to the processor, the method comprising: scanning the steel wheel or steel rim with the X-ray fluorescence analyzer; standardizing the eddy current array probe with a reference standard; placing the eddy current array probe on a surface of the steel wheel or steel rim; scanning the steel wheel or steel rim with an alternating current; sending data to both the remote location computer and the central facility computer; the central facility computer determining whether the scanning is faulty; if the scanning is faulty the central facility computer sending an alert to the remote location computer; after the scanning is completed, the remote location computer analyzing the data; the remote location computer displaying a three-dimensional image of the data on the user interface; and the central facility computer analyzing, compiling and storing the data.

The method may further comprise examining the microstructure of the steel wheel or steel rim.

In the method, the wheel or rim may be examined for a surface discontinuity.

In the method, the wheel or rim may be examined for a sub-surface discontinuity.

In the method, the wheel or rim may be examined for both a surface and a sub-surface discontinuity.

In the method, on site may be a mine site.

The method may further comprise multiplexing the data.

The method may further comprise compiling a data set of inspections over time.

In another embodiment, a method of developing a predictive model of health and remaining useful life of a steel wheel or steel rim of an off the road vehicle on site is provided, the method comprising: the method comprising: selecting a system comprising a computer, the computer having a processor, a memory, the memory to provide instructions to the processor, and a user interface; an eddy current array probe in electronic communication with the computer; and repeatedly over time: standardizing the eddy current array probe with a reference standard; placing the eddy current array probe on a surface of the steel wheel or steel rim; scanning the steel wheel or steel rim with an alternating current; sending data to the computer; the computer analyzing the data; the computer displaying a three-dimensional image of the data set on the user interface; the computer analyzing, compiling and storing the data; the computer determining changes in the data over time, statistically analyzing the changes in relation to time to provide a set of time-based features, applying the time-based features as input values to a selected transformation, and developing a predictive model of health and remaining useful life of the steel wheel or rim using the selected transformation.

The method may further comprise examining the microstructure of the steel wheel or steel rim and sending microstructure data to the computer for analysis.

The method may further comprise the computer correlating the microstructure data with the time-based features.

The method may further comprise the computer developing a microstructure-based predictive model of health and lifespan.

The method may further comprise the computer correlating data from the X-ray fluorescence analyzer with the time-based features.

The method may further comprise further selecting an X-ray fluorescence analyzer in electronic communication with the computer; scanning the steel wheel or steel rim with the X-ray fluorescence analyzer to provide elemental analysis data; and sending the elemental analysis data to the computer.

The method may further comprise the computer correlating data from the X-ray fluorescence analyzer with the time-based features.

The method may further comprise the computer developing an elemental analysis-based predictive model of health and lifespan based on data from the X-ray fluorescence analyzer.

The method may further comprise the computer combining the elemental analysis-based predictive model with the microstructure-based predictive model to determine a predictive model of health and lifespan.

In the method, the wheel or rim may be examined for a surface discontinuity.

In the method, the wheel or rim may be examined for a sub-surface discontinuity.

In the method, the wheel or rim may be examined for both a surface and a sub-surface discontinuity.

In the method, on site may be a mine site.

In another embodiment, a system for predictive modeling of wear and damage to a steel wheel or steel rim of an off the road vehicle is provided, the system comprising: an eddy current array probe which is configured to generate and transmit scans of the steel wheel or steel rim; and a computing device which is electronic communication with the eddy current array probe, and which includes a memory and a processor, the processor under control of the memory, wherein the memory retains a predictive model of health and remaining useful life of the steel wheel or steel rim and is configured to receive the scans, determine changes in the scans over time, statistically analyze the changes in relation to the predictive model of health and remaining useful life of the steel wheel or steel rim and provide a prediction of health and remaining useful life of the steel wheel or steel rim.

FIGURES

FIG. 15 is an example of integrated decision-making: a. wheel and rim condition indicator (microstructure or quality ranking); b. wheel and rim condition indicator (ECA); and c. integrated decision making.

DESCRIPTION

Figure 1:
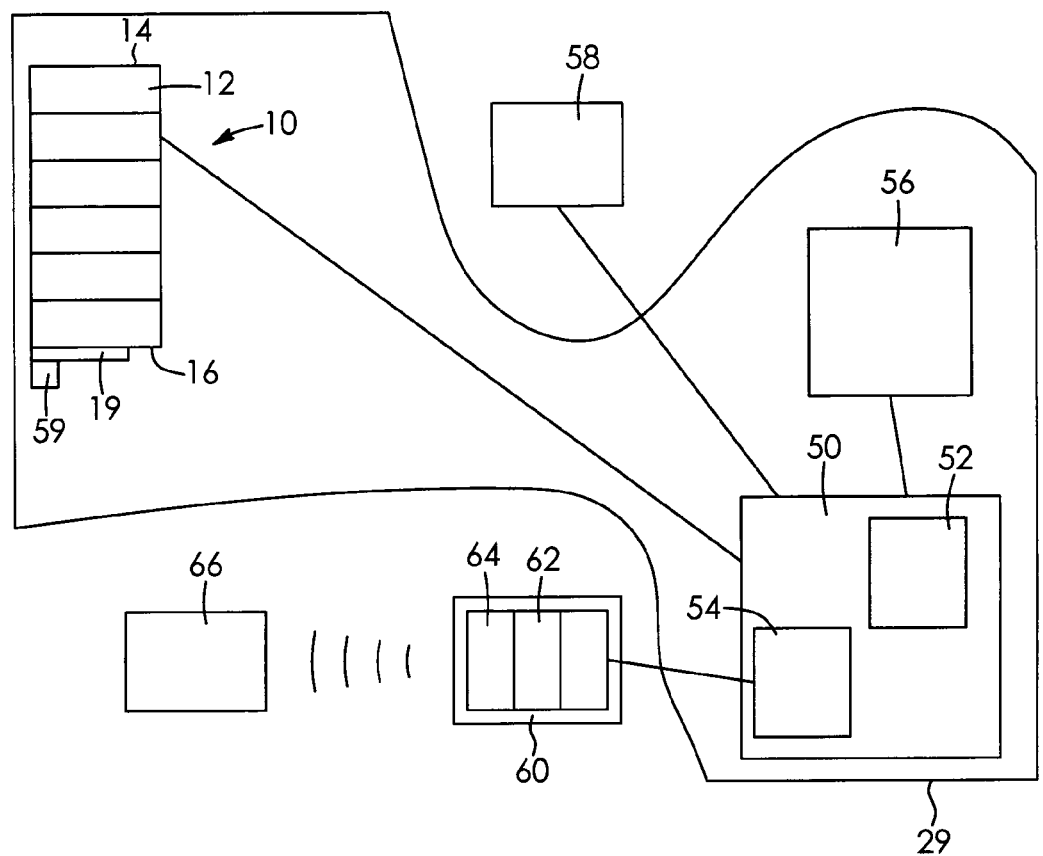
FIG. 1 is a schematic of the system of the present technology.

Techniques operating according to the principles described herein may be implemented in any suitable manner. The processing and decision blocks of the flow charts above represent steps and acts that may be included in algorithms and/or circuitry that carry out these various processes. Unless otherwise indicated herein, the particular sequence of steps and/or acts described in each flow chart is merely illustrative of the algorithms that may be implemented and can be varied in implementations and embodiments of the principles described herein.

The acts performed as part of a method may be ordered in any suitable way. Accordingly, embodiments may be constructed in which acts are performed in an order different than illustrated, which may include performing some acts simultaneously, even though shown as sequential acts in illustrative embodiments.

Except as otherwise expressly provided, the following rules of interpretation apply to this specification (written description and claims): (a) all words used herein shall be construed to be of such gender or number (singular or plural) as the circumstances require; (b) the singular terms "a", "an", and "the", as used in the specification and the appended claims include plural references unless the context clearly dictates otherwise; (c) the antecedent term "about" applied to a recited range or value denotes an approximation within the deviation in the range or value known or expected in the art from the measurements method; (d) the words "herein", "hereby", "hereof", "hereto", "hereinbefore", and "hereinafter", and words of similar import, refer to this specification in its entirety and not to any particular paragraph, claim or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms "comprising," "having," "including," and "containing" are to be construed as open-ended terms (i.e., meaning "including, but not limited to,") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller sub ranges are also included. The upper and lower limits of these smaller ranges are also included therein, subject to any specifically excluded limit in the stated range.

Unless defined otherwise, all technical and scientific terms used herein have the same meaning as commonly understood by one of ordinary skill in the relevant art. Although any methods and materials similar or equivalent to those described herein can also be used, the acceptable methods and materials are now described.

Definitions

Microstructure—in the context of the present technology, microstructure refers to the phase of steel, for example, but not limited to austenite, martensite, pearlite and cementite.

High-resolution microscope—in the context of the present technology, a high resolution microscope provides at least about 800× magnification, preferably 1000× magnification.

Computing device—in the context of the present technology, a computing device includes at least one processor, a network adapter, and computer-readable storage media. A computing device may be, for example, a desktop or laptop personal computer, a personal digital assistant (PDA), a smart mobile phone, a server, or any other suitable computing device. A network adapter may be any suitable hardware and/or software to enable the computing device to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media may be adapted to store data to be processed and/or instructions to be executed by processor. The processor enables processing of data and execution of instructions. The data and instructions may be stored on the computer-readable storage media.

A computing device may additionally have one or more components and peripherals, including input and output devices. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets.

Communication network—in the context of the present technology a communication network includes, but is not limited to a wireless fidelity (Wi-Fi [IEEE 802.11]) network, a light fidelity (Li-Fi) network, a satellite network, the Internet, a cellular data network, a local area network (LAN), a wireless local area network (WLAN), or any combination thereof. The network adapter of the computing device communicates via the communication network.

Computer executable instructions—in the context of the present technology, computer executable instructions include software, including as application software, system software, firmware, middleware, embedded code, or any other suitable type of computer code and also may be compiled as executable machine language code or intermediate code.

Computer readable media—in the context of the present technology, computer readable media includes magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner. Computer-readable media is non-transitory and has at least one physical, structural component.

Data mining tools—in the context of the present technology, data mining tools are for example, but not limited to, Periscope data, Alteryx Analytics, Advanced Miner, Microsoft SQL server Integration Services, Lavastorm Analytics Engine and the like. Data mining tools include: data storage facilities including cloud storage; and transformation algorithms (transformations) such as Naïve Bayes, Decision Tree, Neural Networks, Wavelet Neural Networks, Wavelet Convolutional Neural Networks, Support Vector Machines (SVMs), Logistic Regression, Linear Regression, Non-linear Regression and the like.

DETAILED DESCRIPTION

As shown in FIG. 1, a generalized ECA probe, generally referred to as 10, has a plurality of sensors 12 under the surface of the probe from a distal end 14 to a proximal end 16. The probe output is preferably a high frequency, ranging from about 50 kiloHertz (kHz) to about 700 kHz and all frequencies there between, for example, but not limited to about 500 kHz, as this is particularly well suited to detection of surface discontinuities. Both flexible and rigid probes that are shaped to conform to the shape of a wheel or a rim being assessed have been developed. An encoder 19 is attached to the probe 10 or is integrated into the probe 10.

Three topologies were considered in the probe design:

a) Impedance Topology: absolute or differential, classic mode that offers high level of sensitivity, where minimal lift-off variation. This is capable of detecting discontinuities in any orientation.

b) Single-Drive Topology: transmit-receive mode where one coil acts as a transmitter and the other acts as a receiver. This is capable of detecting sub-surface discontinuities.

c) Double driver topology: acts in a transmit-receive mode, simultaneously uses two coils to act as a single large transmitter. This offers fine resolution and therefore has excellent detection capabilities.

As one objective of the present technology is to reduce, minimize or remove human error, the probe design specifically allows for measurement of surface cracks and does not penetrate further into the material being inspected. The design also specifically allows for detection of wear of about 2 mm, or about 3 mm or greater, and does not, when set to a pass/fail mode, detect wear of less than about 1 mm or about 2 mm, depending upon the setting. In the research and data collection mode, the lift off is set at set positions of about 0.25 mm, about 0.5 mm, about 0.75 mm and about 1.0 mm. This allows for data collection of wear over time at specific sites, allowing for predicting wear and scheduling testing. As testing requires that the wheel be taken off the truck and then the tire taken off the wheel, a predictive model can greatly reduce unnecessary labour and the associated down time for the vehicle.

Compilation of crack data collected from numerous tests show that cracks almost always start in a circumferential orientation, (x axis) then can branch off in an axial orientation (y axis). As it is the x axis crack that propagates the y axis crack, it was concluded that the probe design need only address x axis cracks, thus simplifying the probe design.

Continuing on FIG. 1, the probe 10 and the encoder 19 are in communication with a computer 50, the computer 50 having a processor 52 to receive instructions from a memory 54. The computer 50 converts the impedance information into physical property values for the material under examination, including the lift-off at each point in a B-scan or a C-scan. The computer 50 may be integrated into the probe 10. The computer 50 is in electronic communication with a user interface 56, which may also be integrated into the probe 10. The eddy current array probe 10 and computer 50 are used in the method of the present technology. The computer 50 can be integrated into the probe as an instrument 29. An audible or visual alarm 59 is in communication with the encoder 19. An X-ray fluorescence (XRF) handheld gun 58 is also in communication with the computer 50 and provides elemental analysis (Positive Material Identification). These components of the system are in a remote location, for example, a mine site.

The computer 50 is in communication with a second computer 60, which is housed in a central facility. The central facility may be in a different country to the remote location. There are numerous remote locations where testing is being conducted. The second computer 60 has a processor 62 and a memory 64 with instructions thereon to instruct the processor 62. In addition to the processor 62 communicating with the remotely located computer 50, it communicates with an ERP system 66.

In another embodiment, nondestructive elemental analysis can be performed by any non-destructive testing method including optical emission spectroscopy, inductively coupled plasma analysis, atomic absorption analysis, or proton induced X-ray emission.

Figure 2:
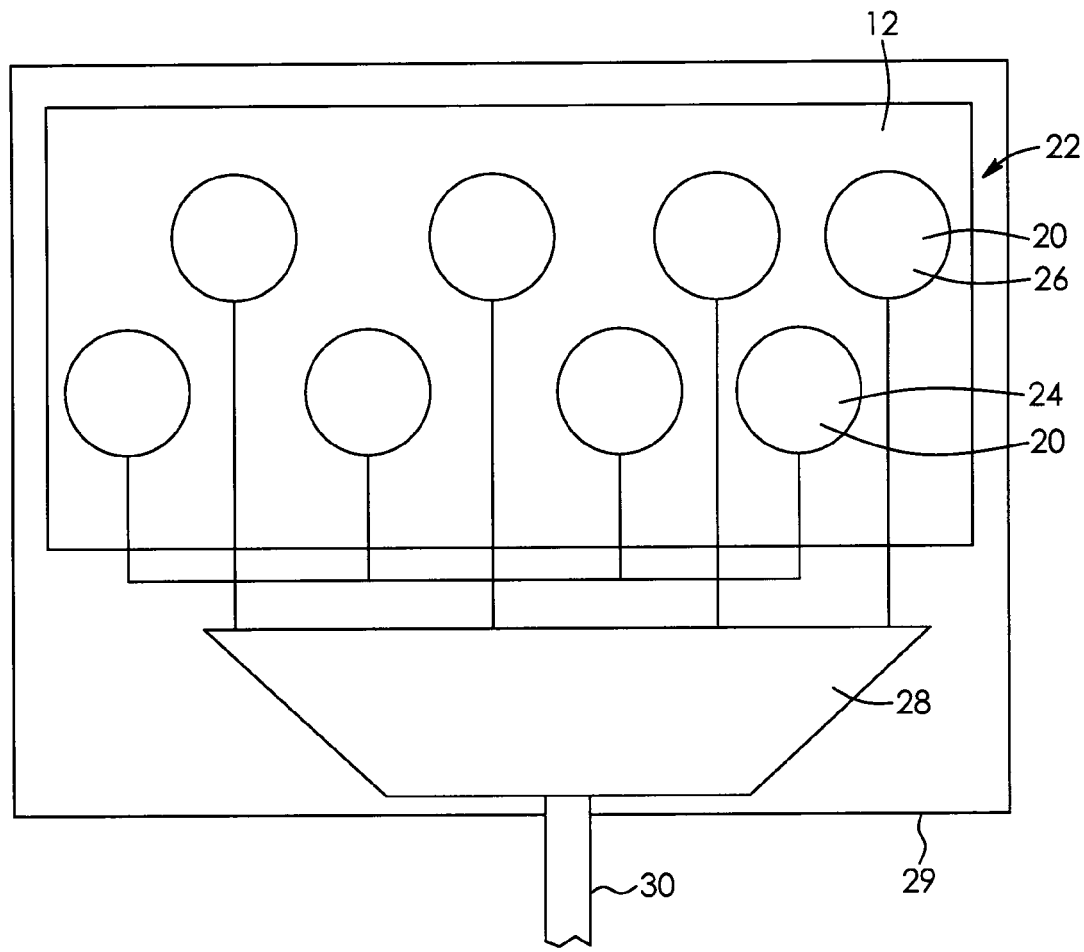
FIG. 2 shows the coil array of a probe of the system of FIG. 1.

As shown in FIG. 2, the sensors 12 have a plurality of pancake coils 20 to form an eddy current array, generally referred to as 22. There are at least two rows of coils 20 offset by half a coil 20. The array 22 is designed to cover the surface to be analyzed. There are drive coils 24 and sensing coils 26. The surface array has: (1) a linear drive conductor and one or more linear arrays of sensing coils positioned parallel to the drive conductor, where the second linear array is aligned with the first row to add redundancy or offset to improve image resolution in the direction transverse to the scan direction; (2) a complex drive conductor that produces a desired field pattern at each sensing coil; and (3) individual drive conductors associated with each sensing coil.

The signals from the eddy current array 22 may pass through a multiplexer 28 and then to data channels 30. The multiplexer 28 can be internal in the instrument 29 or external, separate from the instrument. It is used when the number of sensing coils 26 for impedance measurement is greater than the number of channels 30. The encoder 19 reports the position of the probe 10 to the computer 50.

Figure 3:
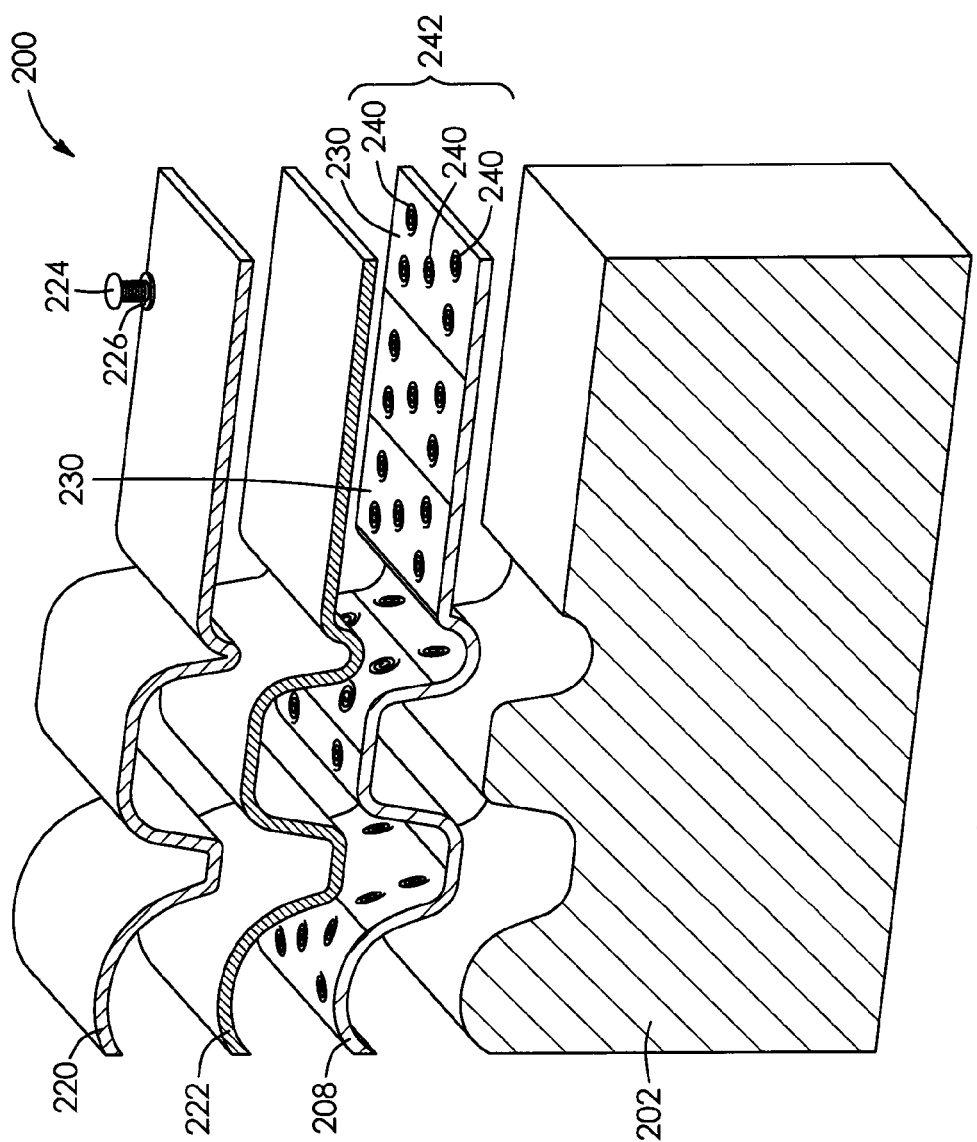
FIG. 3 is an exemplary rigid probe of the present technology.

An exemplary rigid probe design, generally referred to as 200 is shown in FIG. 3. The rigid probe 200 has a holder 202, a sensor layer 208 and a resilient surface 220. The probe output is preferably a high frequency, ranging from about 50 kiloHertz (kHz) to about 500 kHz or about 700 kHz. The sensor layer 208 has a plurality of sensors 230. Each sensor 230 has a plurality of coils 240 to form an eddy current array, generally referred to as 242. The probe 200 is shaped specifically to conform to the shape of the article being tested. The resilient surface 220 is flexible and is bent to the shape of the probe 200. It is long wearing and resistant to scratching. The resilient surface 220 is preferably a plastic polymeric material, such as, but not limited to Ultra-high-molecular-weight polyethylene (UHMW), High-density polyethylene (HDPE), poly vinyl chloride or similar, slippery plastic. A preferred surface is a removable UHMW adhesive-backed flexible plastic film. It has a low coefficient of friction and a high abrasion resistance. If a non-adhesive resilient surface is employed, then it is glued to the sensor layer 208 with a releasable adhesive layer 222. This allows for replacement of the resilient surface 220, as needed. A lift off mechanism 224 may be attached to the probe 200 and extends outward from the probe 200. It has factory settings that allow for only specific lift offs to be used. For pass/fail testing, the lift off is 2 mm. A gauge 226 on the lift off mechanism 224, which may be a ball on a spring, is in electronic communication with the computer 50, either directly or through a processor 228 or circuit board 230. As would be known to one skilled in the art, any means of adjusting and controlled the lift off may be used.

In the preferred embodiment the probe design allows for direct placement of the probe on the surface to be inspected. Lift off need not be adjusted.

Figure 4:
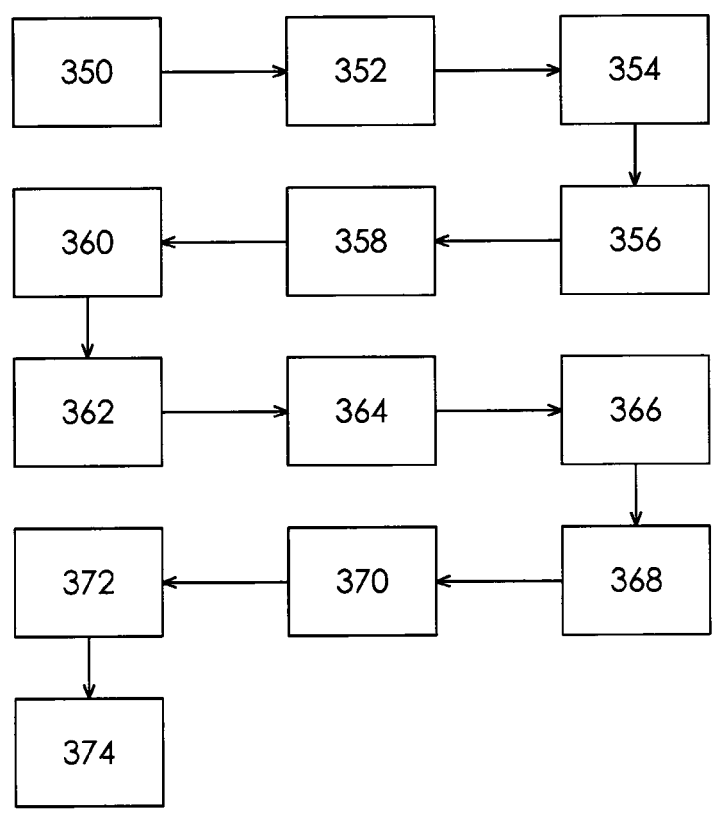
FIG. 4 is a block diagram of the elemental analysis method of the present technology.

An overview of the elemental analysis method is shown in FIG. 4. The method is used for crack detection, wear patterns and early signs of pitting in off the road vehicle wheels and rim, on site. Testing is done on:
Lock Ring Groove/O-ring Groove;
Back section contact point;
bead seat band contact points & butt weld;
Side Ring contact points & butt weld;
Mounting disc stud holes—surface on the disc;
All fillet welds;
All circumferential and transverse butt welds; and
Area adjacent to the valve hole.

A number, for example two or more, wheels or rims in a number of different locations or in the same location can be tested simultaneously. The part to be assessed is cleaned 350. There is no need to remove paint or any surface coating. The XRF gun is run 352 over the surface to be tested. This is done manually by an operator. This is a non-destructive testing method for elemental analysis of the wheels or rims. Without being bound to theory, it is anticipated that the use of different alloys in the wheels and rims may affect the quality of the wheels and rims. For example, chromium and vanadium both make the steel more hardenable. Chromium also helps resist abrasion, oxidation, and corrosion. Chromium and carbon can both improve elasticity. Copper is added to increase corrosion resistance. Nickel increases strength, impact strength and toughness, while also improving resistance to oxidization and corrosion. Nickel is an austenite forming element. Manganese improves hardenability, ductility and wear resistance. Like nickel, manganese is an austenite forming element. Raw data are sent 354 to the remotely located computer 50 which may determine 356 the composition in terms of alloys and may also determine 358 if there are differences in the composition within the wheel or rim of the wheel. The data are sent 360 to the computer 60 at the central facility for storage. Alternatively, the remotely located computer 50 may relay 362 the raw data to the computer 60 at the central facility. That computer 60 then determines 364 the composition of the wheel or rim and to determines 366 if there are differences in composition in the given wheel or rim to provide 368 composition data. The composition data for each wheel and rim manufacturer are stored 370 in a first database. Multiple data sets are being sent 372 to the computer 60 at the central facility, hence the processor, under control of the memory, sorts 374 the composition data and stores the composition data for a specific rim or wheel from a specific remote location in a second database. Each wheel and rim is provided with a unique identifier.

The ECA method is used for crack detection, wear patterns and early signs of pitting in off the road vehicle wheels and rim, on site. Testing is done on:
Lock Ring Groove/O-ring Groove;
Back section contact point;
bead seat band contact points & butt weld;
Side Ring contact points & butt weld;
Mounting disc stud holes—surface on the disc;
All fillet welds;
All circumferential and transverse butt welds; and
Area adjacent to the valve hole.

Figure 5:
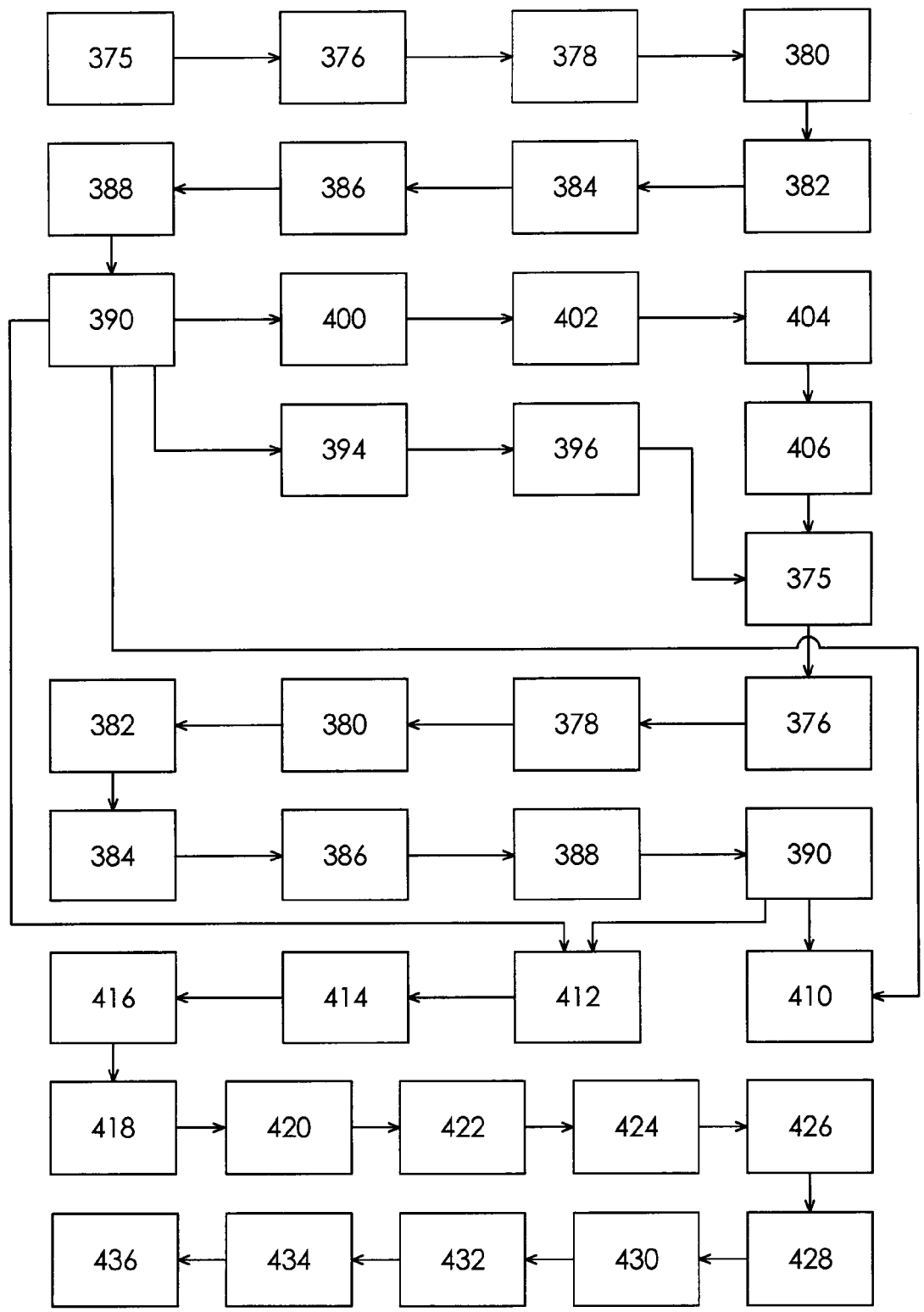
FIG. 5 is a block diagram of the ECA inspection of the present technology.

As shown in FIG. 5, a number, for example two or more, wheels or rims in a number of different locations or in the same location can be tested simultaneously. Three scenarios are shown: a scan at an incorrect speed; an incomplete scan; and a correct scan. The part to be assessed is cleaned 375. There is no need to remove paint or any surface coating. Each wheel or rim has been provided with a unique identifier at the time that the elemental analysis was conducted, hence the wheels and rims are tracked. The operator then uses the eddy current array probe to assess the integrity of the wheel or rim. A reference standard is used to standardize 376 all the channels of the array. The probe is placed 378 on the surface of the part to be assessed. The probe design allows the probe to be placed directly on the surface without the lift off being set. The surface is scanned 382 with an alternating current, by moving the probe along the surface. The scan speed is manually controlled 384 as the operator slides the probe over the surface being inspected. If the operator allows the probe to dwell 386 in a position, the audible alarm sounds 388. The probe data are being continuously transmitted 390 to the computer 60 in the central facility as well as to the computer 50 in the remote location. The software in the computer 60 in the central facility determines 394 that the probe speed was not properly controlled, as the encoder data will show the probe had not moved for a time and then started to move again. The computer 60 in the central facility reports 396 the faulty scan to the computer 50 in the remote location and the test is repeated. The operator moves 400 the probe over the surface of the wheel or rim but stops 402 before the entire 360° of the wheel or rim surface is inspected. The software in the computer 60 in the central facility determines 404 that the probe did not move over the entire circumference of the wheel or rim, as the encoder data will show this error. The computer 60 in the central facility reports 406 the faulty scan to the computer 50 in the remote location and the test is repeated.

If there are no defects the alternating current produces 410 a uniform magnetic field above the surface. If there are defects, the alternating current leads 412 to a non-uniform magnetic field. The signal provides 414 position and depth information. This signal is then processed 416 by the processor using instructions provided 418 by the memory to provide 420 depth, length and position information with regard to cracks. Data can be analyzed from individual coil channels or for the entire surface. A three-dimensional image is produced 422 and displayed 424 on the user interface of the computer 50 in the remote location. The computer 60 in the central facility sorts 426 incoming data in terms of:

Customer name;
Mine site;
Truck Model;
Wheel Size;
Wheel original equipment manufacturer (OEM);
Manufacture Date;
Hours of operation;
Inspector; and
Wheel Identification/Serial Number.

The computer 60 in the central facility performs 428 data analysis, including, but not limited to correlating XFR data with probe data and produces 430 reports including, but not limited to wear and surface discontinuities over the life of a given wheel or rim, or wear and surface discontinuity data for a given manufacturer or given alloy. The processed data are archived 430 in the memory of the computer 60 in the central facility for future reference. The computer 60 in the central facility communicates 432 the processed data to the ERP system where it is also archived 434. This may be by WiFi or Bluetooth® radio or other wireless communication. Reports are generated 436 using selection criteria including, for example, but not limited to history of a given wheel, history of a given manufacturer's wheels and history of a given operator's performance. The inspections are conducted routinely (every two year, typically) and data accumulated over the life of the wheel or rim, hence a picture of the health of the wheel or rim, and the timeline to failure can be determined. The working time for the wheels and rims is tracked so that working time can be used as a metric for predictive modeling.

The probe will detect surface discontinuities and wear can be determined from the lift off data provided, thereby providing a complete assessment of the integrity of the wheel or rim.

Figure 6:
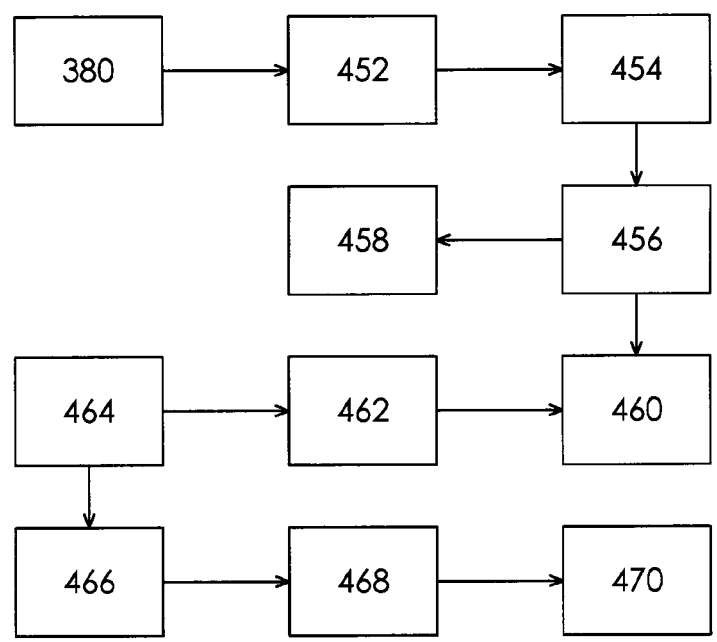
FIG. 6 is a block diagram of another ECA inspection method of the present technology.

As shown in FIG. 6, if wear is to be determined lift off is set 380 at 2 mm for pass/fail assessment, or at one of 0.5, 1.0, or 1.5 mm for data collection. This can be done separately, or in conjunction with examining for surface discontinuities. If there is wear that is greater than the lift off setting, the probe will fail to send a signal 452. The lack of signal or presence of signal is then processed 454 by the processor using instructions provided 456 by the memory to provide a pass reading 458 or a fail reading 460. If used for data collection, the processors will process 462 the signal using instructions provided 464 by the memory to provide 466 data on wear, shape of wear area and position information. This can be further processed 468 using date stamps to produce 470 predictive models for wear. As a first step in developing the predictive model, historical data for wheels and rims was ranked and graphed, leading to an estimate of time to failure. Defect qualitative analysis was carried out to check whether the defect exists and identify defect type (e.g., pitting, corrosion, and tooth broken etc.). Then, criterion was designed to characterize the degree of the structural discontinuity according to its type, geometry, and depth. In this regard, existing defect identification methods (such as principal component analysis-based methods and independent component analysis based methods and defect quantification methods such as the magnetic Barkhausen noise-based method and new feature-based method were investigated. Finally, the wheel or rim degeneration trend was evaluated and quantified according to the inspection results. It was been determined that rims and wheels that have lost 2 mm or more metal should be taken out of service. This can be from wear or pitting. By setting lift off to 2 mm, if the area being inspected has lost 2 mm or more metal, the eddy current array doesn't detect the worn area, there is no signal, the display indicates lift-off and the rim is therefore removed from service. This therefore is a quantitative assessment that minimizes any human error.

If desired, a magnetic particle examination occurs. This is not essential as it does not provide any additional information.

Figure 7:
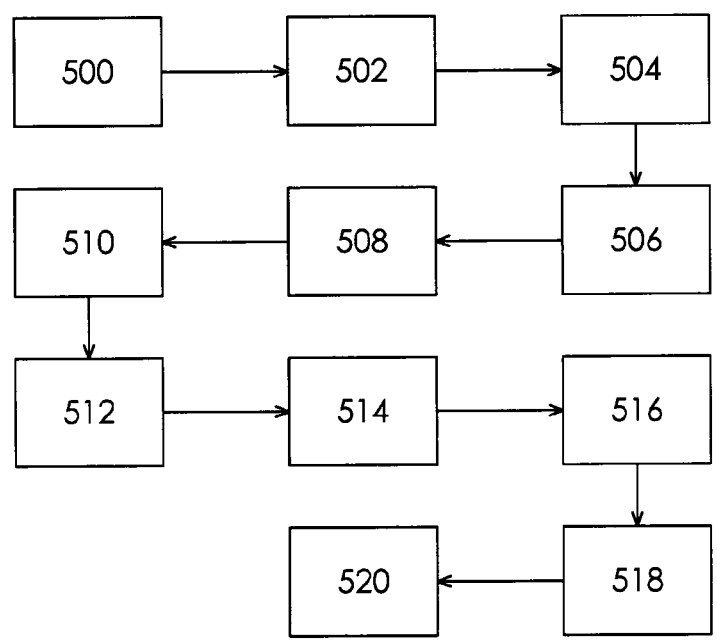
FIG. 7 is a block diagram of light microscope inspection of the microstructure of steel of the present technology.

As shown in FIG. 7, light microscopy (which may be, for example, but not limited to brightfield or darkfield) is used to study the microstructure of the steel. This is conducted at the same time as the elemental analysis is done and is also done each time an ECA inspection is conducted. A number, for example two or more, wheels or rims in a number of different locations or in the same location can be tested simultaneously. The part to be assessed is cleaned 500. Paint or any other surface coating is removed 502 in a small area. Each wheel or rim has been provided with a unique identifier at the time that the elemental analysis was conducted, hence the wheels and rims are tracked. A hand-held light microscope is used to examine 504 the steel. A magnification of 1000× is sufficient to be able to determine the microstructure, hence it is determined whether the steel is martensitic or austenitic or other microstructure and the relative proportions of each. Without being bound to theory, martensitic steel is preferable for wheels and rims of off the road vehicles. The determination is done at the same time as the elemental analysis. The operator ranks 506 the steel on the basis of relative amount of martensitic steel. The microstructure ranking data are sent 508 to the remotely located computer 50. The microstructure ranking data are sent 512 to the computer 60 at the central facility for storage. The microstructure ranking data for each wheel and rim manufacturer are stored 514 in a first database. Multiple data sets are being sent 516 to the computer 60 at the central facility, hence the processor, under control of the memory, sorts 518 the microstructure ranking data and stores 520 the microstructure ranking data for a specific rim or wheel from a specific remote location in a second database.

Figure 8:
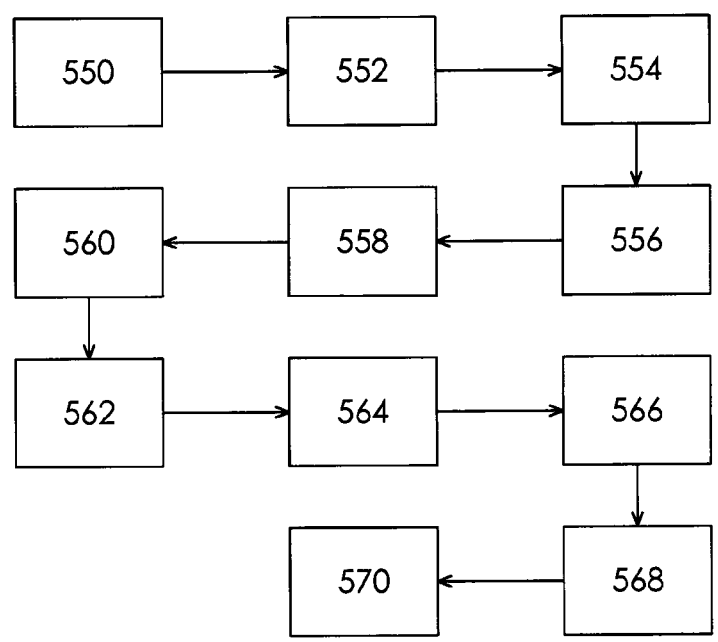
FIG. 8 is a block diagram of light microscope inspection of the microscopic integrity of the steel of the present technology.

As shown in FIG. 8, light microscopy is also conducted when ECA inspections are done. This is to determine the microscopic integrity, for example if there are corrosion-related issues such as corrosion cracking, corrosion fatigue, hydrogen embrittlement, inclusions, internal stress and the like. A number, for example two or more, wheels or rims in a number of different locations or in the same location can be tested simultaneously. The part to be assessed is cleaned 550. Paint or any other surface coating is removed 552 in a small area. Each wheel or rim has been provided with a unique identifier at the time that the elemental analysis was conducted, hence the wheels and rims are tracked. A hand-held light microscope is used to examine 554 the steel. A magnification of 1000× is sufficient to be able to determine the microscopic integrity. The operator ranks 556 the steel on the basis of the findings. The ranking data are sent 558 to the remotely located computer 50 which may determine 560 the microscopic integrity of wheel or rim. The data are sent 562 to the computer 60 at the central facility for storage. The microscopic integrity ranking data for each wheel and rim manufacturer are stored 564 in a first database. Multiple data sets are being sent 566 to the computer 60 at the central facility, hence the processor, under control of the memory, sorts 568 the microscopic integrity ranking data and stores 570 the microscopic integrity ranking data for a specific rim or wheel from a specific remote location in a second database.

Figure 9:
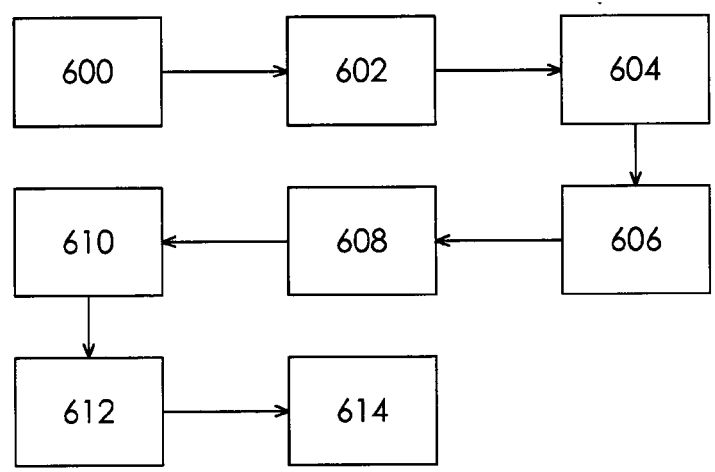
FIG. 9 is a block diagram of an alternative approach to ranking in FIGS. 7 and 8.

As shown in FIG. 9, in an alternative embodiment, rather than the operator ranking the microstructure and microscopic integrity of the steel wheel or rim, digital images are taken 600. The images are sent 602 to the remotely located computer 50 which may determine 604 the microscopic integrity of wheel or rim. The data are sent 606 to the computer 60 at the central facility for storage. The microscopic integrity ranking data for each wheel and rim manufacturer are stored 608 in a first database. Multiple data sets are being sent 610 to the computer 60 at the central facility, hence the processor, under control of the memory, sorts 612 the microscopic integrity ranking data and stores 614 the microscopic integrity ranking data for a specific rim or wheel from a specific remote location in a second database. Without being bound to theory Wavelet Convolutional Neural Networks are useful for mining images of the wheels and rims in order to develop predictive models and from that, preventative maintenance schedules.

Figure 10:
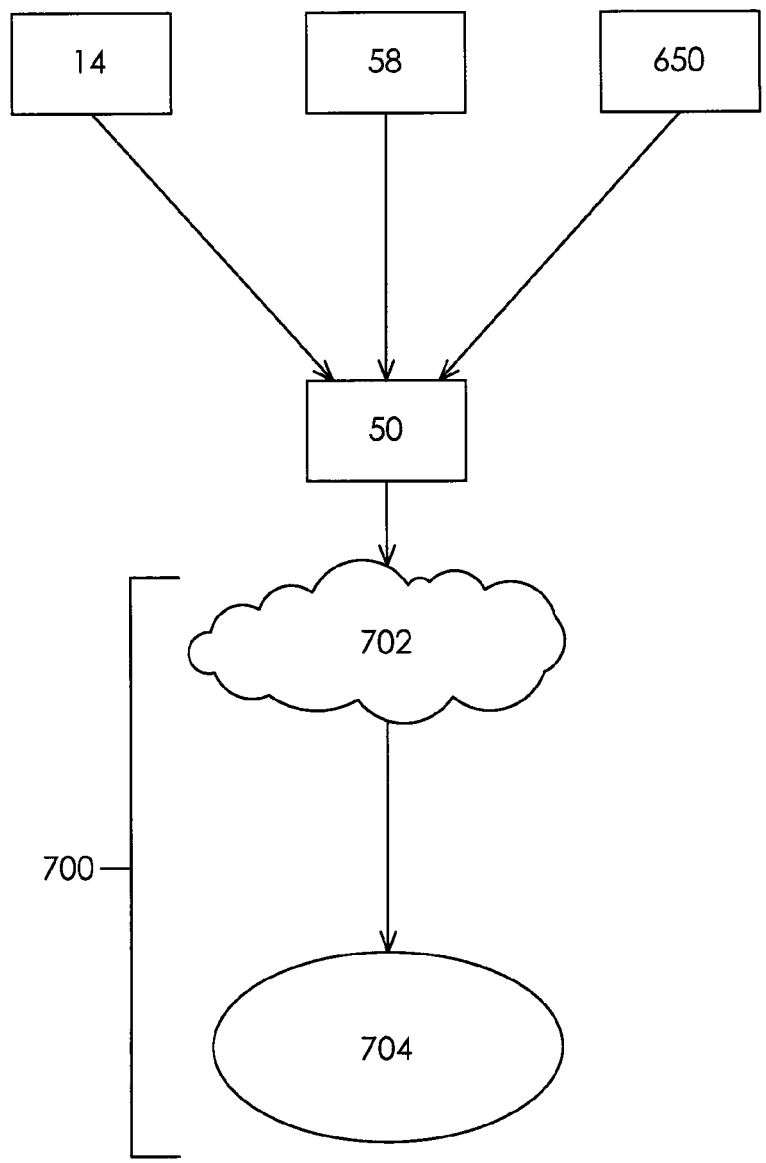
FIG. 10 is an overview of the predictive modeling system of the present technology.

As shown in FIG. 10, a predictive model system includes the ECA probe 14, the X-ray fluorescence analyzer 58 and the light microscope 650, all which directly or indirectly communicate with a computing device 50, which in turn communicates with a data mining system, generally referred to as 700. The data mining system 700 includes a data storage facility 702 and a data mining tool 704, which is housed in a computing system.

Figure 11:
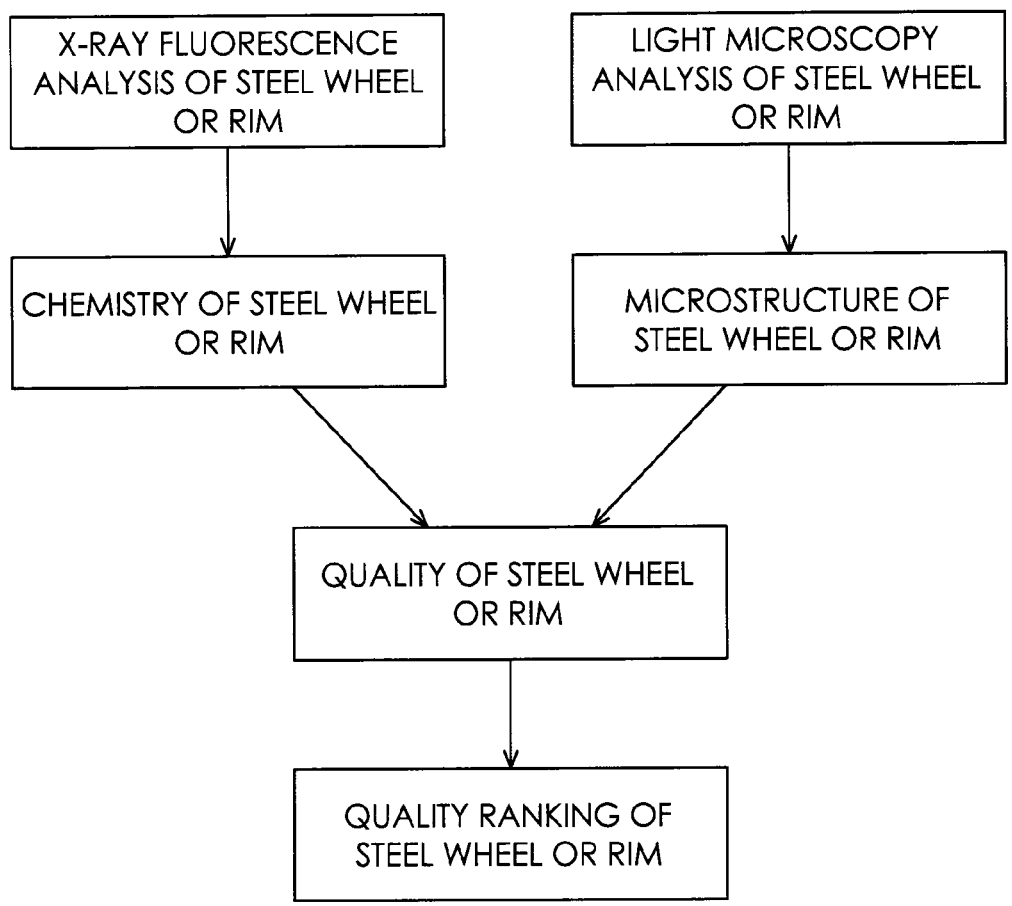
FIG. 11 is a block diagram of the method of determining steel quality.

As shown in FIG. 11, the chemistry data from the elemental analysis and the microstructure data from the light microscopy are combined using a processor driven method to ascribe a quality to the steel of the wheels and rims. This is preferably conducted on new wheels and rims but can be done on wheels and rims that are in service, however, the data from those is service should generally not be included in developing predictive models. The quality is defined as a quality ranking.

Figure 12:
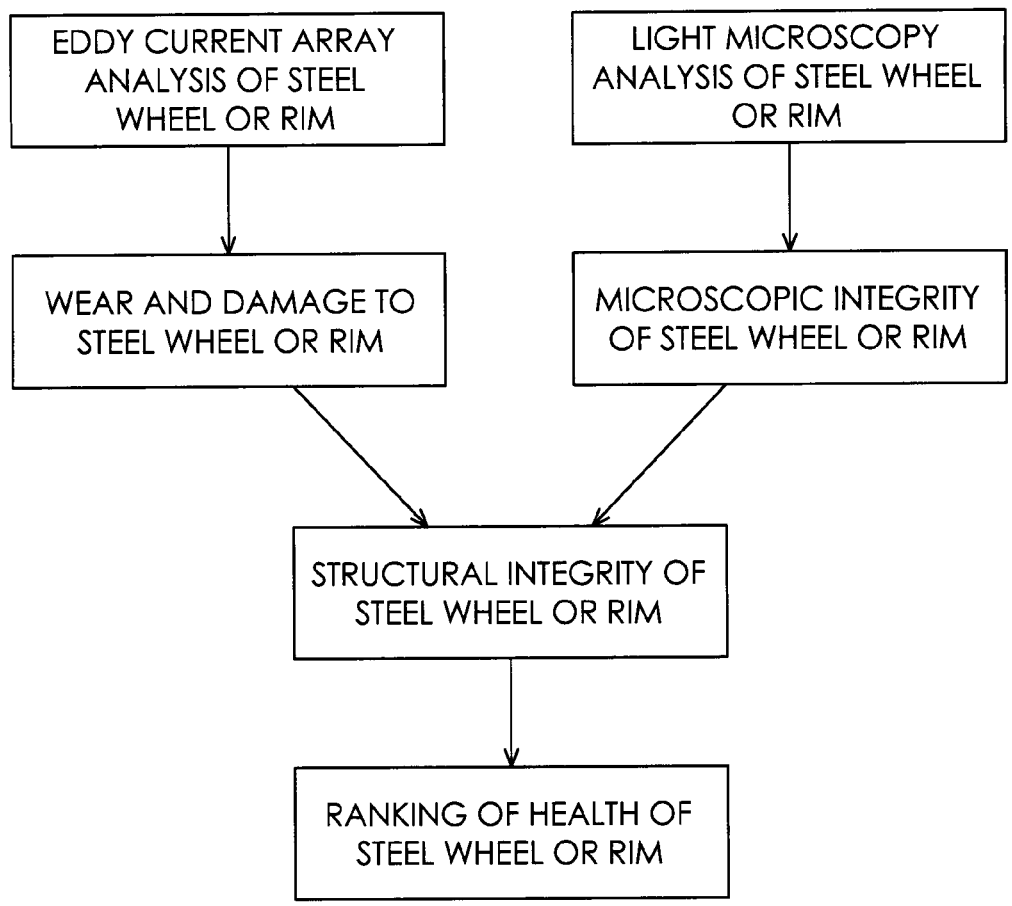
FIG. 12 is a block diagram of the method of ranking wheel health.

As shown in FIG. 12, the microscopic integrity from the light microscopy and the wear and damage data from the ECA analysis are combined using a processor driven method to ascribe a structural integrity to the steel of the wheels and the rims. This is conducted periodically on wheels and rims that are in service and the data are included in developing predictive models. The structural integrity is defined as a ranking of health.

Figure 13:
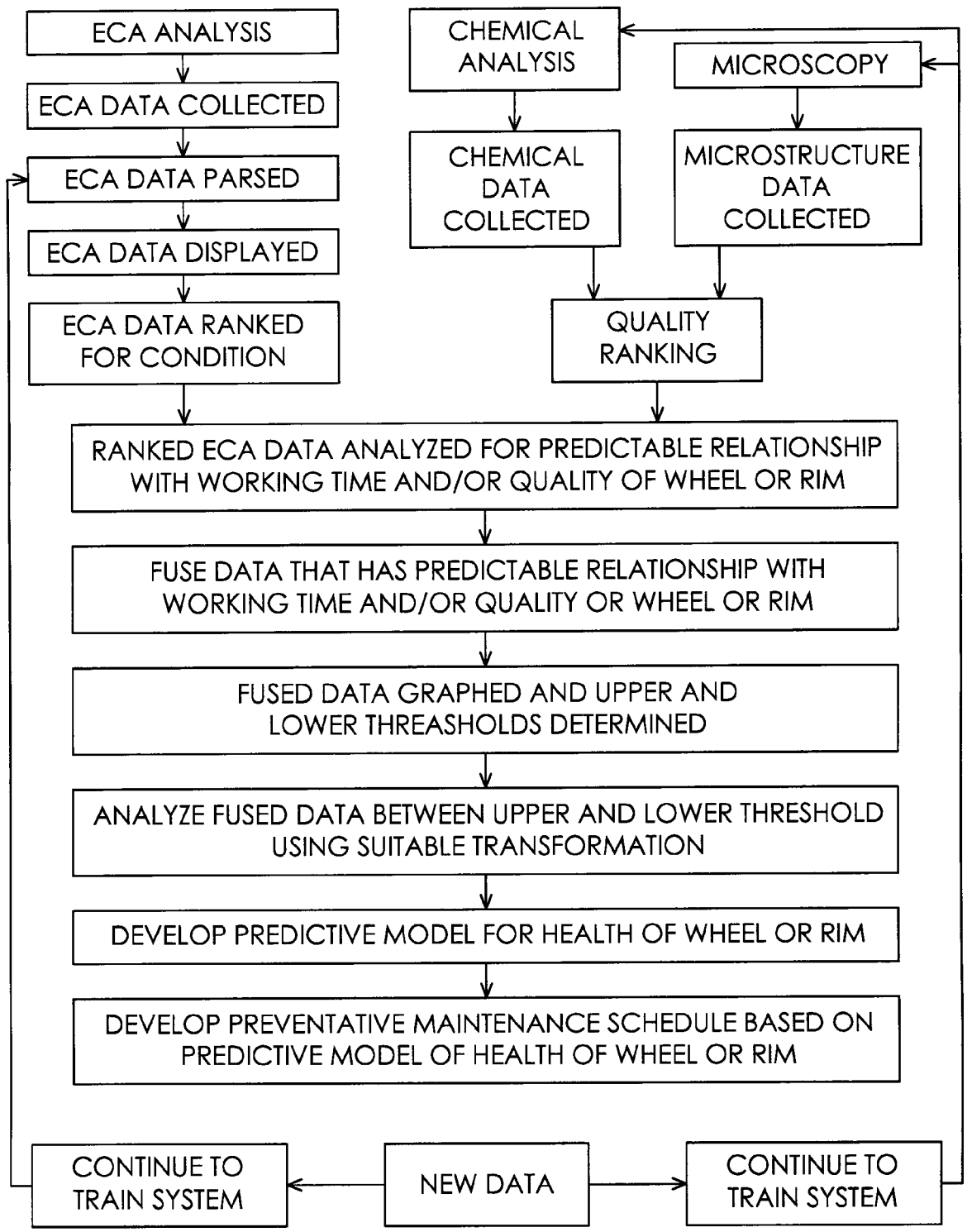
FIG. 13 is a block diagram of the method of developing a predictive model for steel wheels and rims of off the road vehicles.

A method of predictive modeling for wheels and rims of off the road vehicles is shown in FIG. 13. As noted above, data are collected when the wheels and rims are new and as they age. With the exception of the data acquisition steps (operator conducting ECA scans, operator taking light microscopy digital images and operator conducting elemental analysis), the steps are all processor driven. The chemical analysis data and microstructure data are combined to give a quality ranking.

The ECA analysis results in digital ECA data which are collected. The digital ECA data are then parsed to remove noise and are optionally displayed on a user interface. The digital ECA data are ranked for condition. The ranked ECA data are combined and analyzed to find a predictable relationship between one or more of working time and quality of the steel wheel or rim, as determined by chemical analysis and microscopy. The data that have a predictable relationship with the working time and/or the quality of the steel in the wheel or rim are fused. The fused data are graphed and the upper and lower thresholds are determined. The fused data between the thresholds are then analyzed using a suitable transformation. As new data are collected the system continues to be trained. A predictive model for health of the wheels and rims is developed, and on that basis a preventative maintenance programme is developed.

Figure 14:
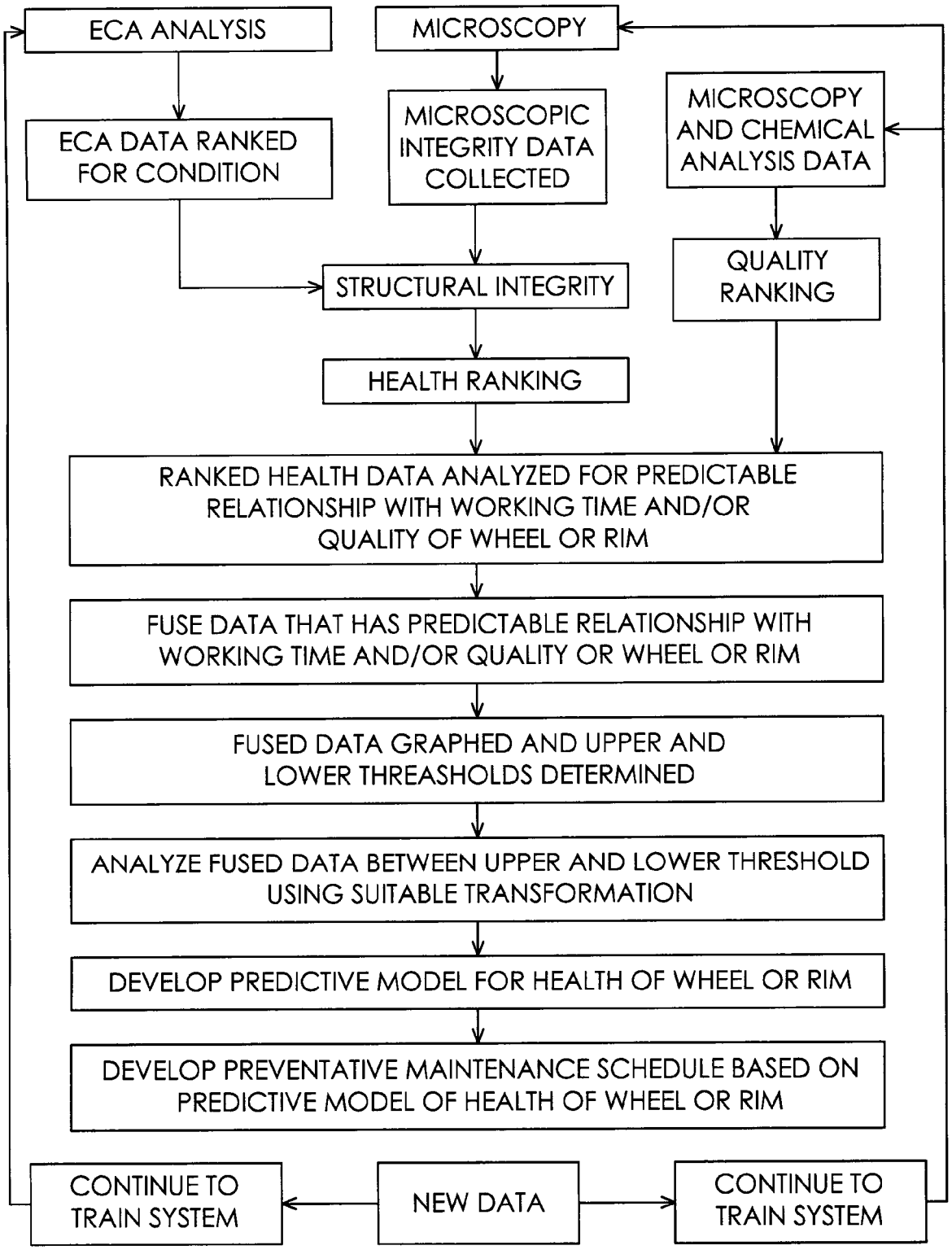
FIG. 14 is a block diagram of a more comprehensive method of developing a predictive model for steel wheels and steel rims of off the road vehicles.

As shown in FIG. 14, a more comprehensive and preferred method of predictive modeling includes light microscopic examination of the wheel or rim when the ECA inspecting is done. In this manner, the data can be combined to provide a determination of structural integrity. This then is used to provide a health ranking. An analysis determines whether the ranked health data has a predictable relationship with working time and/or quality of the wheel or rim.

When determining the quality of the steel in the rim or wheel and determining the structural integrity and health ranking, the data may be ranked as needed.

As shown in FIG. 15, the condition indicators will be graphed over time. The condition indicators include microstructure, quality ranking and ECA analysis. The relationship between the condition indicators and health of the wheel or rim are then compared. The condition indicators are fine-tuned as data are added. Thus, a more reliable and robust degeneration trend can be estimated. According to the estimated trend, the real-time wheel or rim health status can be concluded by checking the tuned condition indicator over time. Subsequently, a prediction model will be built to forecast the remaining useful life, warning of potential failure, and failure time interval. The prediction methods, such as Kalman filtering, particle filtering, and Bayesian model, will be investigated comprehensively.

Example 1

Steel wheels from two different manufacturers were analyzed for this chemical profile using X-ray fluorescence analysis. The results are shown in Table 1:

| Element | Fe | Ti | Mn | Cr | Cu | Ni | Zn | LEC* | V | C |
|---|---|---|---|---|---|---|---|---|---|---|
| Wheel 1 | 96.8 | .59 | 1.4 | .05 | .02 | .003 | .002 | .45 | 0 | .074 |
| Wheel 2 | 96.93 | .67 | 1.10 | .33 | .32 | .542 | 0 | 0 | .029 | .079 |

*LEC represents light alloying elements that X-ray fluorescence is unable to discriminate between.
ECA analysis of the wheels showed that Wheel 2 was inferior, as it had more defects, including pitting, wear and cracks, and the cracks were longer. The working life of Wheel 2 was significantly shorter than the working life of Wheel 1 (About 15,000 hours versus about 30,000 hours).

Example 2

Wheels from the different manufacturers will be non-destructively inspected using X-ray fluorescence and light microscopy prior to their use. It will be found that the wheels from the second manufacturer (Wheel 2) will have significantly more chromium, copper and nickel as compared to the wheels from the first manufacturer (Wheel 1). The light microscopy showed that Wheel 2 had less martensitic steel and more austenitic steel than did Wheel 1. Thus, both the elemental analysis and the light microscopy led to a lower rating in terms of the steel quality. After the wheels had been in use for two years, and every two years after that, the wheels will be non-destructively inspected using ECA and light microscopy. Within four years Wheel 2 will be receive a higher ECA rating, with 1 being minimal defects and 9 requiring that the wheel be taken out of service. Similarly, within four years Wheel 2 will exhibit more microscopic defects. The macroscopic defects and the microscopic defects both indicate that the structural integrity of Wheel 2 is poor in relation to Wheel 1. After about 8 years, Wheel 1 will have to be taken out of service, while Wheel 2 will have another 7 years of service left.

While example embodiments have been described in connection with what is presently considered to be an example of a possible most practical and/or suitable embodiment, it is to be understood that the descriptions are not to be limited to the disclosed embodiments, but on the contrary, is intended to cover various modifications and equivalent arrangements included within the spirit and scope of the example embodiment. Those skilled in the art will recognize or be able to ascertain using no more than routine experimentation, many equivalents to the specific example embodiments specifically described herein. For example, other imaging techniques may be used, resulting in other images being analyzed. Such equivalents are intended to be encompassed in the scope of the claims, if appended hereto or subsequently filed.

The invention claimed is:

1. A method of developing a predictive model of wear and remaining useful life of a steel wheel or steel rim of an off the road vehicle on site, the method comprising: selecting a system comprising a computer, the computer having a processor, a memory, the memory to provide instructions to the processor, and a user interface; a non-integral eddy current array probe in electronic communication with the computer; and repeatedly over time: standardizing the eddy current array probe with a reference standard; placing the eddy current array probe on a surface of the steel wheel or steel rim; periodically scanning the steel wheel or steel rim with an alternating current; sending data to the computer; the computer analyzing the data; the computer displaying a three-dimensional image of the data set on the user interface; the computer analyzing, compiling and storing the data; the computer determining changes in the data over time, statistically analyzing the changes in relation to time to provide a set of time-based features, applying the time-based features as input values to a selected transformation, and developing a predictive model of wear and remaining useful life of the steel wheel or rim using the selected transformation, wherein multiple wheels and rims are tested concomitantly.

2. The method of claim 1, further comprising the computer detecting an error in the scanning.

3. The method of claim 2, further comprising scheduling of inspecting and preventative maintenance.

* * * * *